United States Patent [19]
Fletcher et al.

[11] 3,952,976
[45] Apr. 27, 1976

[54] DEPLOYABLE FLEXIBLE TUNNEL

[76] Inventors: James C. Fletcher, Deputy Administrator of the National Aeronautics and Space Administration, with respect to an invention of; Newton D. Brown; Gordon L. Jeppesen, both of Cuyahoga Falls, Ohio; Nicholas C. Costakos, New Orleans, La.

[22] Filed: Dec. 27, 1974

[21] Appl. No.: 536,762

[52] U.S. Cl. .............................. 244/158; 114/16.6; 244/137 P; 244/161
[51] Int. Cl.² ............................................ B64G 1/00
[58] Field of Search ............... 244/137 P, 163, 161, 244/173, 158; 114/16.6; 254/144; 61/84; 14/71 A

[56] References Cited
UNITED STATES PATENTS

| | | | |
|---|---|---|---|
| 1,070,639 | 8/1913 | Topper | 114/16.6 |
| 2,942,816 | 6/1960 | Dostie | 244/137 P |
| 3,537,668 | 11/1970 | Kosmo et al. | 244/163 |
| 3,639,934 | 2/1972 | Eggert | 14/71 A |

*Primary Examiner*—Trygve M. Blix
*Assistant Examiner*—Barry L. Kelmachter
*Attorney, Agent, or Firm*—George J. Porter; L. D. Wofford, Jr.; John R. Manning

[57] ABSTRACT

A pressurized flexible tunnel which employs a plurality of equal length cables between ends of the tunnel. The cables are lengthened or shortened together by a single winch to adjustably constrain elongation. By positioning one set of cables on one side of the tunnel and another on the opposite side of the tunnel, the tunnel may be expanded or contracted along a straight line or along a curve as permitted by externally positioned orienting means.

2 Claims, 4 Drawing Figures

DEPLOYABLE FLEXIBLE TUNNEL

ORIGIN OF THE INVENTION

1. Field of the Invention

This invention relates to tunnel construction, and particularly to a flexible tunnel adapted to be pressurized and employed between two vehicles in outer space.

2. General Description of the Prior Art

Initially, manned space flights involved the employment of one-time usage space vehicles especially made up for a particular mission or activity in space. Recently, however, development has commenced on reusable vehicles which would have the capability of repeated flights from earth into space and which would carry as cargo modules different payloads. As a result, the need has arisen for some form of tunnel device to connect a vehicle and an attachable cargo module which would enable in-flight passage of personnel between the vehicle and the cargo module. A further need has been that the tunnel device be capable of providing relative movement between the vehicle and the cargo module either along a straight line or along an arc. One example of its need to provide linear movement is to effect a shift in the position of the cargo module along a center line of the vehicle while the vehicle is in flight to maintain or achieve a desired center of gravity for the loaded vehicle.

An example of the need for the cargo module to be moved along an arc occurs when it is desired to move the cargo module from within the confines of the space vehicle to a position outboard of the space vehicle in order to make some observation requiring such outside exposure. This would be the case where a cargo module mounts a telescope, which would need to be free of the obstruction of the space vehicle itself.

It is, accordingly, an object of the present invention to provide a deployable tunnel capable of meeting the foregoing and other requirements as hereinafter discussed.

SUMMARY OF THE INVENTION

In accordance with the present invention, a flexible tubular member is attached along, to, and between a plurality of serially arranged frame members wherein these elements comprise an accordian-like tubular housing. Two cable assemblies, one on each side of the housing, extend between end frame members with each assembly including at least two spaced cable runs. At least two spaced pulleys are secured to one end frame member for each cable, and at least two spaced cable terminals are attached on the other of the end frame members, one for each cable. A cable winding device is secured to one of the end frame members, and it provides one of the cable terminals for each cable and enables the simultaneous winding of the cables. By this arrangement, the tubular housing may be elongated or shortened either linearly or along a controlled arc.

DETAILED DESCRIPTION OF THE DRAWINGS

Figure 1A:
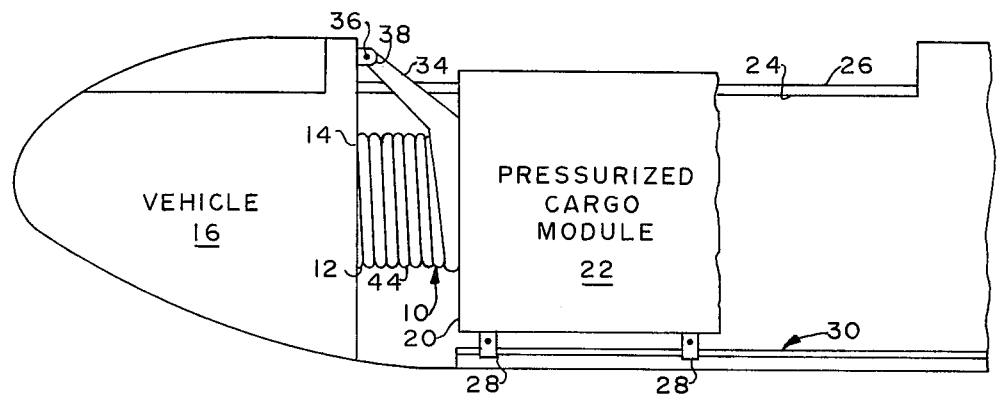
FIGS. 1a–1c are diagrammatic views illustrating different operating positions of the deployable tunnel of this invention.
Figure 1B:
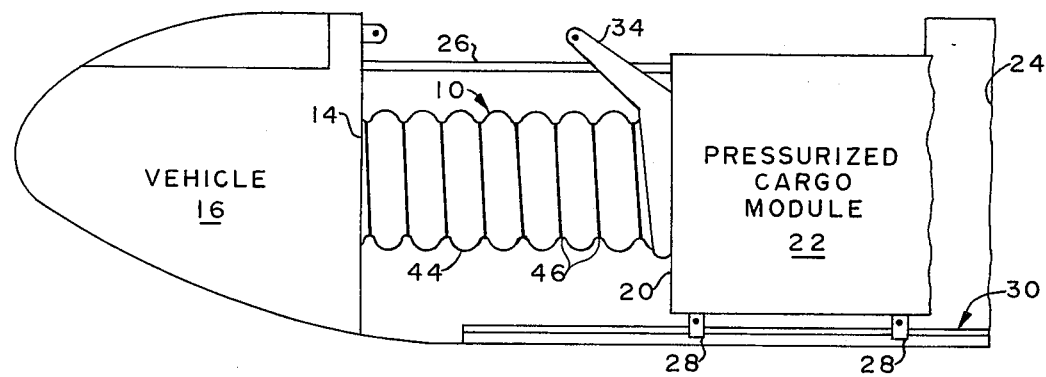
Figure 1C:
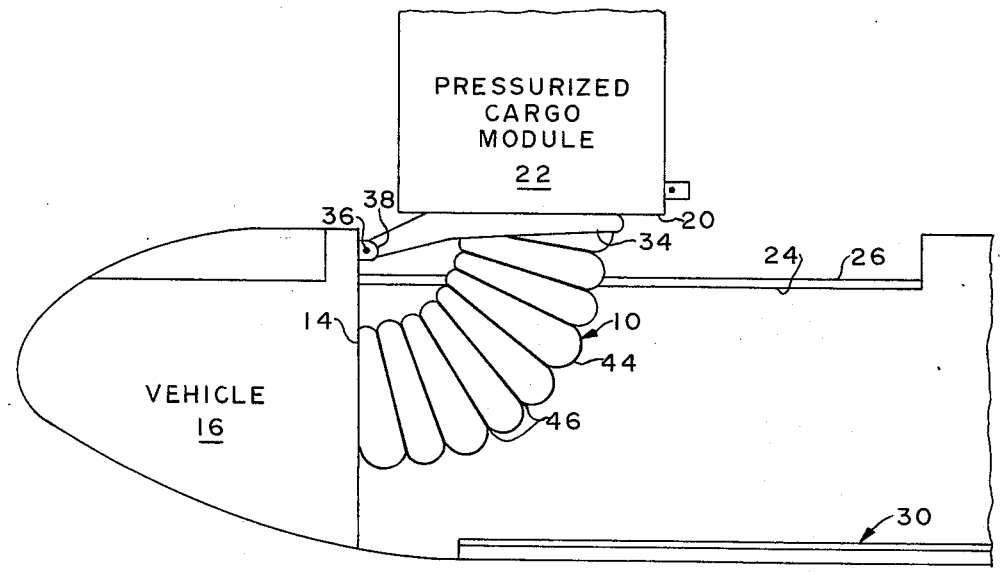

Referring initially to FIGS. 1a–1c, there is diagrammatically illustrated a tunnel 10 fabricated in accordance with the invention. It is adapted to be sealably attached at one end 12 to a wall 14 of space vehicle 16 and at the other end 18 to wall 20 of cargo module 22. Cargo module 22, which may vary in size and content, is adapted to be carried within a compartment 24 of vehicle 16 and is inserted and removable through openable hatch 26. It is guided longitudinally within vehicle 16 by means of rollers or slide members 28 attached to cargo module 22 and operating with respect to track assembly 30 attached to vehicle 16. Tunnel 10 is also connectable to vehicle 16 by means of arms 32 and 34 (FIG. 2) pivotally attached by pins 36 to clevis members 38 to vehicle 16.

FIG. 1b illustrates the deployment of tunnel 10 and cargo module 22 by a linear path from the position illustrated in FIG. 1a, pins 36 being removed.

FIG. 1c illustrates the deployment of tunnel 10 and cargo module 22 along an arc with cargo module 22 actually lifted outside of vehicle 16.

Tunnel 10 is expandable and contractible as a function of applied differential air pressure between its inside and outside. This pressure is applied from vehicle 16. A typical differential pressure for operating tunnel 10 would be one atmosphere. Under pressure, tunnel 10 attempts to achieve maximum volume, and its deployment is controlled by restraining forces effected by cable system 42 illustrated in FIG. 2 and outside physical restraints as illustrated in FIG. 1a.

Tunnel 10 employs a flexible cylindrical cover 44, and, depending upon its use and environment, may be fabricated of various materials. For use in outer space, the cover is typically constructed of an inner gas-type pressure bladder and over this bladder there would be constructed, in this order, a laminated structural sleeve, a micrometeoroid barrier, and an outer environmental cover or thermal blanket. Cover 44 is pleated, having a plurality of spaced valleys 46 to which are attached rigid circular frames or rings 48. Rings 48 contain a plurality of circumferentially spaced cable guide openings 50. The guide openings are axially aligned to enable the cables to be maintained at identical spacing where cables pass through the openings and openings serving one cable bear identical numerical designations.

Connection of tunnel 10 to vehicle 16 is made at end 12, with tunnel 10 being sealably connected to flange 52 and flange 52 in turn being sealably connected to bulk head 54. Bulk head 54 is then sealably attached to opening 56 of vehicle 16. At the opposite end of tunnel 10, end 18 is sealably connected to flange 58, the latter being sealably connected to bulk head 60, and bulk head 60 in turn being sealably connected to cargo module 22. Passage through the tunnel is enabled by circular openings 61 and 62 of the bulk head.

Figure 2:
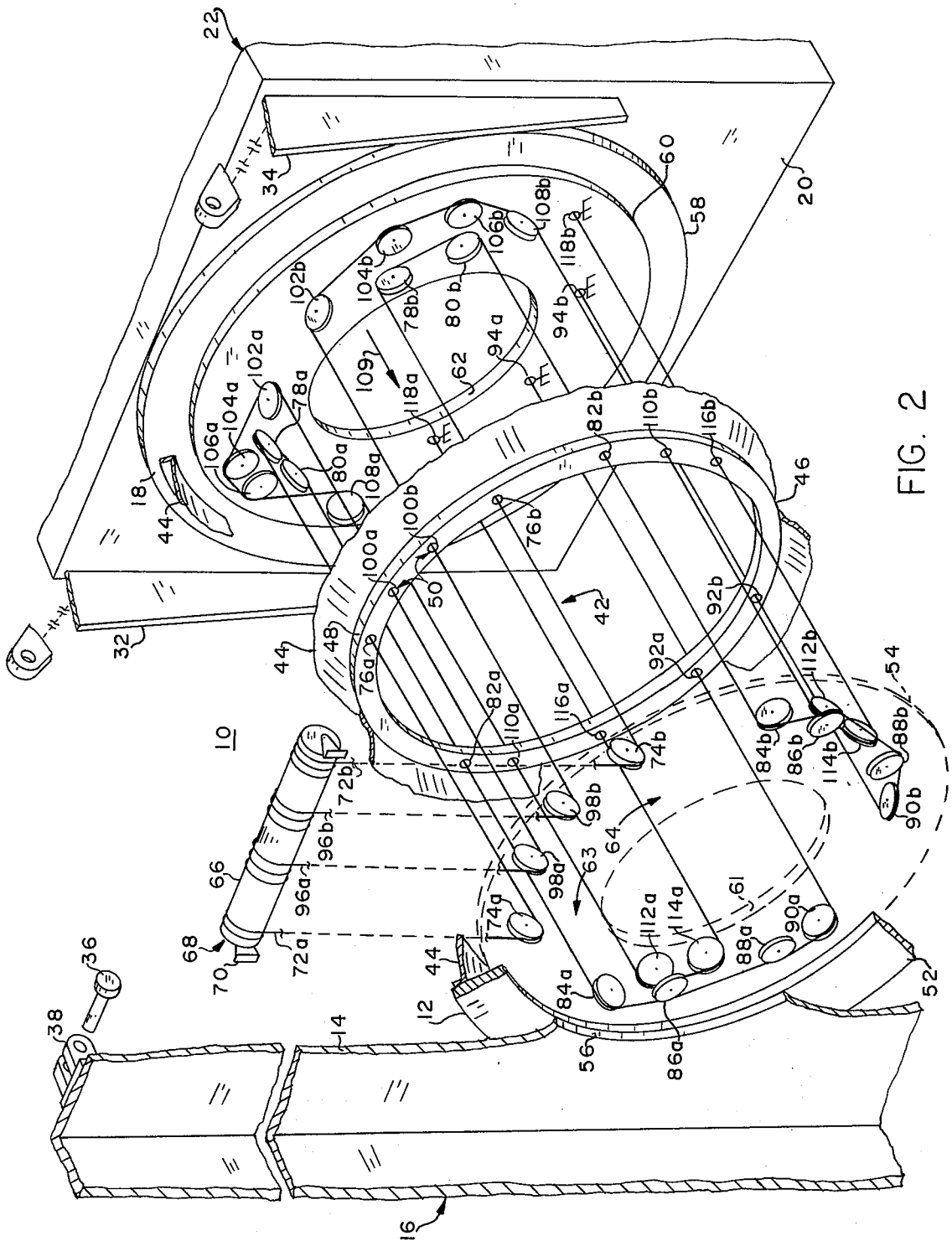
FIG. 2 is a perspective view, partially diagrammatic, of the pulley and cable assemblies employed by the invention.

Cable assembly 63 controls the left hand of tunnel 10 as viewed in FIG. 2, and cable assembly 64 controls the right half of tunnel 10. Each cable assembly includes two cables of equal length. Like components of the cable assembly bear like numerical designations but with the subscript "a" for components on the left side and the subscript "b" for components on the right side. One end of each cable is wound onto drum 66 of power-driven winch 68, which is mounted by supports 70 to vehicle 16. From drum 66 each cable traverses tunnel 10 three times, passing through rings 48, and is then rigidly attached to bulk head 60 of cargo module 22. Thus, cable 72a of cable assembly 63 extends from drum 66, around pulley 74a, and then between vehicle 16, through aligned openings 76a in rings 48 of cargo module 22, where it passes over pulleys 78a and 80a and passes back through aligned openings 82a in rings 48 to vehicle 16. At vehicle 16 it passes over pulleys 84a, 86a, 88a, and 90a and then passes back to cargo module 22 through aligned openings 92a where it is rigidly attached at point 94a to bulk head 60. Cable 96a of cable assembly 63 extends from drum 66 over pulley 98a and thence between vehicle 16 and cargo module 22 through aligned openings 100a. At cargo module 22 it passes over pulleys 102a, 104a, 106a, and 108a and runs back through aligned openings 110a to vehicle 16 where it passes over pulleys 112a and 114a and then runs back through aligned openings 116a to cargo module 22 where it is attached to bulk head 60 at point 118a.

The paths of cables 72b and 96b of cable assembly 64 controlling the right side of tunnel 10 are a mirror image of the system described with respect to cable assembly 42 with, as described above, all like elements of the right hand cable control system designated with like numbers to those on the left side but with the subscript "b".

In operation, assuming it is desired to deploy cargo module 22 in a straight line as illustrated in FIG. 1b, cable drum 66 of winch 68 (FIG. 2) would be rotated in a counterclockwise direction to unwind each of cables 72a, 96a, 72b, and 96b from the drum and thus pay out cable which would permit pressure from pressurized cargo module 22 to flow into the tunnel as indicated by arrow 109 to expand and elongate tunnel 10 in a straight line as guided by tracks 30. If it is desired to deploy the tunnel at right angles to vehicle 16 as shown in FIG. 1c, the tunnel would first be collapsed as shown in FIG. 1a by rotating motorized winch 68 in a clockwise direction, shortening the cables and thus pulling bulk head 60 inward to the packaged position shown in FIG. 1a. Pin 36 would then be inserted through each of clevis-type fixtures 38, attached to a vehicle wall, to thereby couple arms 32 and 34 to vehicle 16. Once the arms are thus pivotally connected to vehicle wall 14, drum 66 of winch 68 would be rotated in a counterclockwise direction paying out the cables and the air pressure force would cause the cargo module 22 to rotate about pivot pin 36 and thus tilt the cargo module upward, as shown in FIG. 1c and out of vehicle 16.

It is readily seen from the arrangement of the cables shown in FIG. 2 that a redundancy factor is provided and thus the failure of a single cable will not disable or unbalance the restraining action of the cable assemblies. A further feature of the invention is that all cables travel the same distance regardless of the direction of deployment, either along a straight line or along an arc. Further, although the invention has been illustrated and described in terms of its use with vehicles operating in outer space, it is to be appreciated that it may be successfully operated in the earth's atmosphere. In such case, tunnel 10 would be sufficiently pressurized to expand to a desired length.

What is claimed is:

1. A deployable tunnel comprising:
   a plurality of serially arranged frame members, each having an opening therethrough;
   a flexible tubular member attached along, to, and between said frame members and together comprising an elongatable accordian-like tubular housing;
   a first end frame at one end of said tubular member and a second end frame at an opposite end of said tubular member;
   a first pulley assembly comprising an upper and lower pulley secured to an edge side region of said first end frame;
   a second pulley assembly comprising an upper and lower pulley secured to an opposite edge side region of said first end frame;
   a third pulley assembly secured to an edge side region of said second end frame;
   a fourth pulley assembly secured to an opposite edge side region of said second end frame opposite to the position of said third pulley assembly;
   a first cable assembly comprising at least one cable extending along and guidably engaging said frame members and including means for securing at least two runs of said cable, an upper run and a lower run, between said first and third pulley assemblies and for securing one end of said cable to a said end frame;
   a second cable assembly comprising at least one second cable extending along and guidably engaging said frame members and including means for securing at least two runs of said second cable, an upper and a lower run, between said second and fourth pulley assemblies and means for securing one end of said second cable to one of said end frames;
   means for applying an elongating force to said housing;
   cable operating means including a winch, having a winding drum, secured to one of said end frames and all of the other, otherwise free, ends of said cables being connected to, and simultaneously wound on, said drum, whereby said tubular housing may be elongated or shortened; and
   deployment means including an arm member pivotally attached between said end frames for enabling said tunnel to be deployed in an arc upon operation of said cable operating means, said arm being selectively detachable from one of said end frames, whereby said deployable tunnel is selectively deployable either along a line or along an arc.

2. A deployable tunnel as set forth in claim 1 wherein said means for applying an elongating force to said housing includes means for sealably connecting said tubular housing to said end frames and means for applying pressure to the interior of said housing, whereby upon the application of pressure, said housing will extend or shorten, as permitted by said cable operating means.

* * * * *

UNITED STATES PATENT AND TRADEMARK OFFICE
CERTIFICATE OF CORRECTION

PATENT NO. : 3,952,976

DATED : April 27, 1976

INVENTOR(S) : James C. Fletcher, Administrator of NASA, with respect to an invention of: Newton D. Brown et al It is certified that error appears in the above-identified patent and that said Letters Patent are hereby corrected as shown below:

On the cover sheet, in the heading to the printed specification, immediately after "James C. Fletcher," delete "Deputy."

Column 1, line 4, immediately below "ORIGIN OF THE INVENTION," add the following -- The invention described herein was made in the performance of work under a NASA contract and is subject to the provisions of section 305 of the National Aeronautics and Space Act of 1958. Public Law 85-568 (72 Stat. 435; 42 U.S.C. 2457).

BACKGROUND OF THE INVENTION --

Signed and Sealed this

Tenth Day of August 1976

[SEAL]

Attest:

RUTH C. MASON
*Attesting Officer*

C. MARSHALL DANN
*Commissioner of Patents and Trademarks*